Dec. 18, 1956 K. A. LOFTMAN 2,774,651
DRYING AGENT AND PROCESS OF MAKING THE SAME
Filed Nov. 7, 1952 3 Sheets-Sheet 1

INVENTOR.
Kenneth A. Loftman.
BY
Kenway, Jenney, Witter & Hildreth
Att'ys.

United States Patent Office 2,774,651
Patented Dec. 18, 1956

2,774,651

DRYING AGENT AND PROCESS OF MAKING THE SAME

Kenneth A. Loftman, Boston, Mass., assignor to Godfrey L. Cabot, Inc., Boston, Mass., a corporation of Massachusetts Application November 7, 1952, Serial No. 319,287

8 Claims. (Cl. 23—122)

This invention relates to drying agents and comprises a new and improved desiccant composition, granular in form and having exceptional water adsorption properties. The invention includes within its scope of a novel process of producing this desiccant.

There are in commercial use many varieties of desiccants designed to reduce the moisture content of the atmosphere in selected areas and the effectiveness of such desiccants is measured by their capacity for water and their rate of absorption. The material having the greatest capacity and highest rate of water absorption makes the best desiccant. Price is also a consideration since large quantities of drying agent are required for continuous operations. One reasonably priced desiccant which is used extensively is calcium sulphate. The desiccant composition of our invention has at least 50% greater water capacity and substantially greater drying efficiency than calcium sulfate.

The composition of our invention is a complex of silica and calcium sulphate. It is produced by the reaction of wollastonite (calcium meta silicate) with sulphuric acid in certain critical proportions as hereinafter described and is in the form of solid granules or shapes.

Although it is known to react calcium silicate with acids to produce finely-divided pigments, the properties of such pigments vary widely depending upon the acid used and the conditions of reaction. Thus, pigments consisting principally of silica have been described in the literature as being produced by reaction of calcium silicate with acids, some of which form soluble and others insoluble calcium salts along with the silica. However, none of such pigments described in the prior art have any particular desiccating properties.

We have discovered that a drying agent having superior properties may be produced by the following steps. Wollastonite is mixed with an aqueous solution of sulphuric acid in concentration of 10% to 35%, the amount of the solution being sufficient to react with 95% to 100% of all of the wollastonite present. The resulting precipitate is then formed into shapes as by turbulent agitation, compression, extrusion and the like.

Certain of the conditions of this process are critical. Only sulphuric acid can be used and in aqueous solution at concentrations between 10% and 35%, the total amount of acid must be sufficient for theoretical reaction of 95% to 100% of the wollastonite, and the resulting precipitate must be formed into solid shapes in order to permit the passage of gases therethrough. If any of these critical conditions is omitted, the product will not be a good desiccant.

For example, when the concentration of sulphuric acid exceeds about 35%, the product has notably lower absorption characteristics. On the other hand, when the acid concentration is less than 10% the product is gel like, poorly adsorbent and is difficult to form into usable solid shapes.

The physical characteristics of the product of this invention are important in their end use. While the desiccant in powder form would naturally present the greatest initial surface to the atmosphere, it would be very difficult to force gases therethrough or to maintain the material in position when passing gases thereover. For that reason it is necessary to agglomerate the pigment into suitable solid shapes and an important feature of my invention lies in the agglomerating step.

In general, I react a quantity of calcium silicate, preferably mineral wollastonite, with an amount of sulfuric acid water solution that is substantially stoichiometric with the calcium silicate, the solution, having a sulfuric acid concentration of between 10 and 35%, and preferably between 20 and 30%. The acid concentration is critical; when it exceeds 35%, the desiccant formed thereby has inferior absorption characteristics. On the other hand, when the acid concentration is less than 10%, a product resembling a gel is formed which is inferior in desiccant properties and is difficult to process into desirable granules. The reaction is somewhat violent. The temperature of the mixture rises rapidly, and a substantial amount of gas, which is essentially steam is evolved. During the reaction the mass may be agitated to facilitate complete mixing of the ingredients. A cake of white substance, having a bulk density of approximately 17 lbs./cu. ft., when dry is formed by this reaction.

The reaction product is extremely friable and disintegrates to a fluffy powder upon slight attrition. It is unsuitable as a solid desiccant because of its fluffy, powdery nature, since it presents a dusty substance which is easily transported in low velocity gas streams, and thereby creates a dust nuisance. Furthermore, the friction presented by the enormous surface area of this powder causes intolerable pressure drop characteristics in the ordinary solid desiccant application.

I have found that this powdery material may be converted into a highly desirable desiccant, merely by compressing the powder to form self-sustaining agglomerates. Curiously enough, the amount of compression required to accomplish this result is not great, in fact it is only necessary to increase the density of a material to about 19 lbs./cu. ft. in order to produce discrete self-sustaining agglomerates or aggregates. I have found that I can compress the powdery material sufficiently to form agglomerates either by pelletizing in one of the usual pelletizing apparatuses, such as that described in U. S. Letters Patent 2,102,654, Billings et al., or by confining the mass of powder and subjecting it to a static load, or by extruding the powder in a device such as that described in U. S. Letters Patent 2,283,364, issued May 19, 1942, to Hansen et al. I have found that wetting the powder with water, facilitates compression when it is accomplished by the pelletizing or extruding techniques.

It has also been found that while the powdery material resulting from the reaction of sulfuric acid and calcium silicate may be compressed to form satisfactory solid desiccants, the resulting agglomerate has a slight amount of occluded acid, which may in some applications make it somewhat undesirable. Furthermore, it has been found that a neutral agglomerate is slightly more effective as a desiccant; accordingly it is desirable to remove the excess occluded acid. This may be accomplished by washing the powder before it is compressed. An alternative method for removing the acid is by adding to the powder a water solution of sodium silicate of sufficient concentration to neutralize the occluded acid before it is compressed. Still another method of removing the acid comprises using the sodium silicate solution as a pelletizing medium or as an extrusion medium. Actually, I have found that when a small amount of sodium silicate is used the agglomerates formed are of exceptional hardness and high quality.

These and other features of my invention will be best appreciated and understood from the following description, in connection with the accompanying drawing, in which.

Figure 1:
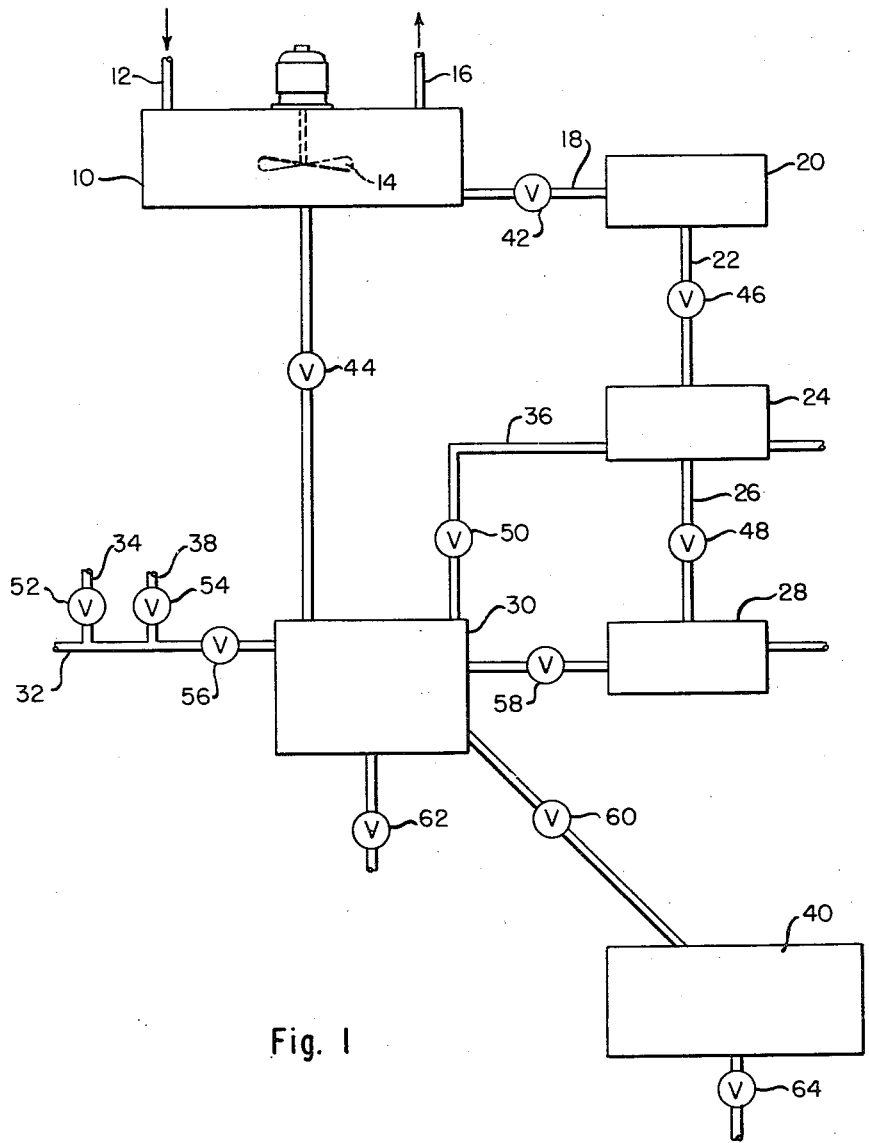
Figure 1 is a flow sheet of my process.

Calcium silicate and water are introduced into a suitable vessel 10, through line 12, and are thoroughly mixed by a suitable agitating means, 14. Sulphuric acid is then added to the suspension of finely divided calcium silicate during agitation, whereupon a vigorous reaction takes place with the formation of a powdery cake having a density of about 17 lb./cu. ft. when washed and dried. Vent 16 is provided in reactor 10, to facilitate the escape of the gaseous product produced by the reaction.

The relative quantities of water and acid used in this reaction are such that together they would produce preferably a 20 to 30% acid solution which would be substantially stoichiometric with the weight of the silicate used. This concentration, however, can be as low as 10% or as high as 35% while the quantity of sulphuric acid used can be as low as 95% of the stoichiometric quantity required for reaction with the weight of silicate chosen.

The resulting mass of powder is usually acidic in nature, which is probably due to the failure of the ingredients to completely react with each other. Accordingly, the powdery material is conveyed by a pipe line 18 into a water bath 20 where the residual acid is removed and then via pipe line 22 to a filter 24, where the excess water is removed. From the filter the powder is conveyed via a pipe line 26 to a dryer 28, where the last traces of water are removed. From the dryer, the powder is conveyed to a suitable pelletizing or compressing unit 30, where the powder is densified to a suitable aggregate or agglomerate as will hereinafter be more fully described.

An alternative expedient for neutralizing the effect of the residual acid consists of applying a solution of sodium silicate to the powdery reaction product. This can most conveniently be accomplished by conducting the product of reaction from mixer 10 directly into the compressing unit 30 and by introducing the sodium silicate solution via pipe lines 32 and 34, which also enter the compressor unit. As a matter of fact, a small amount of moisture, such as would be added in this fashion, has been found to aid materially in the mechanics of pelletization and compression.

The particular procedure employed in compressing the powder is of only secondary importance. It is necessary merely to compress it sufficiently to form discrete self-sustaining agglomerates and this may be accomplished by subjecting the powdery raw material to sufficient compression to raise its density to about 19 lb./cu. ft. For example, I have found that I can pelletize the powder in any well known pelletizing apparatus, as that of U. S. Letters Patent No. 2,121,535, or extrude it by any of the usual well known extruding devices.

Since moisture facilitates the densification of the powdery reaction product, I provide for the direct introduction of moistened reaction products from the filter 24 through pipe line 36. I also provide for the introduction of moisture through lines 34 and 38 for this purpose. Of course it will be understood that if moisture is added to aid the pelletization of the powder, the pellets must be subsequently dried. Accordingly, I have provided a second dryer 40, wherein this moisture is removed. While I have not previously mentioned them, it will be obvious to those skilled in the art, that the flow of materials in accordance with the preferred procedure of my invention, or of any alternate procedure, may be controlled by valves 42 in the pipe line 18 through 64 in the pipe line 22.

Figure 2:
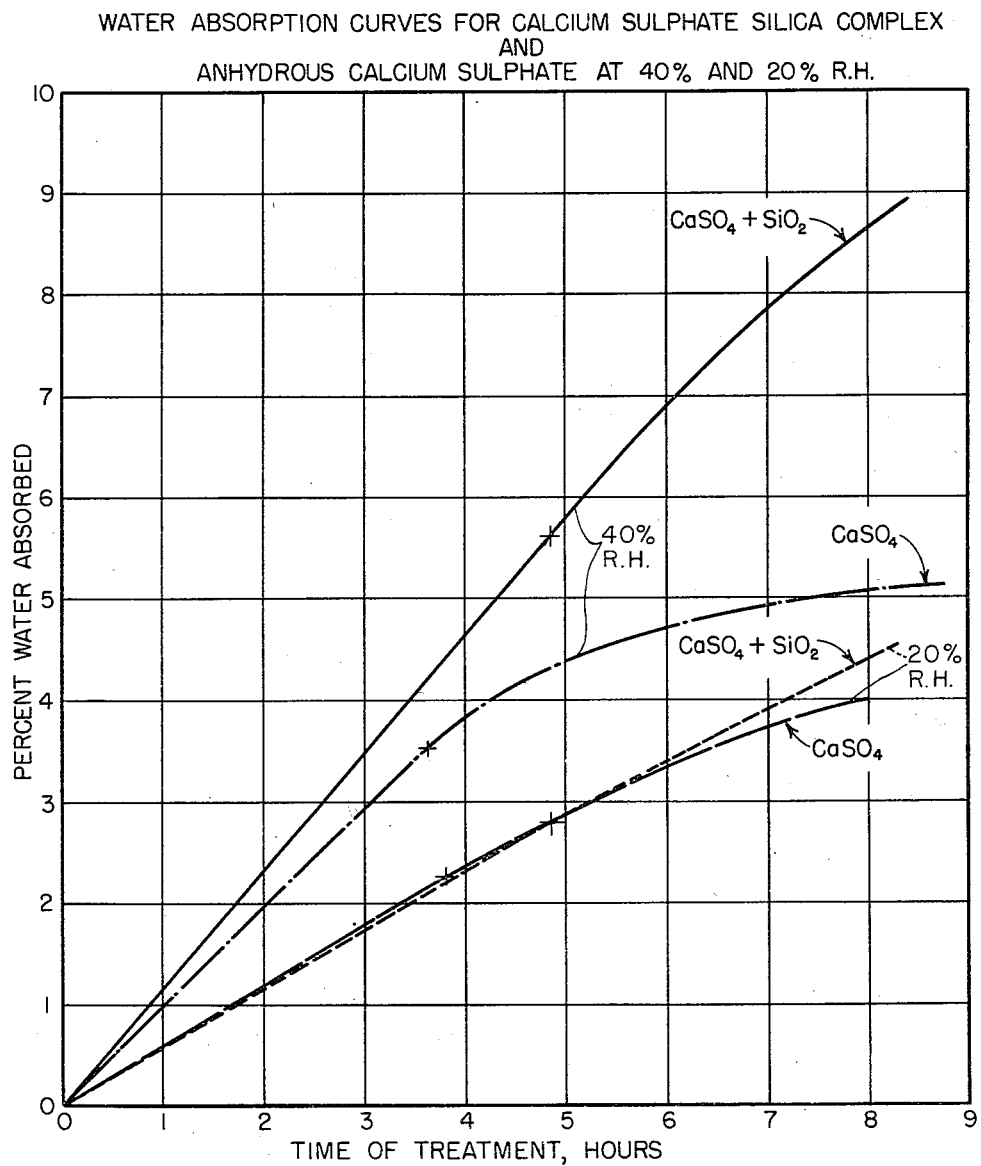
Figure 2 represents typical absorption curves comparing the efficiency of the product of my invention with calcium sulfate at 20% and 40% relative humidity.

While the calcium silicate sulfuric acid reaction powdered product need only be compressed to about 19 lb./cu. ft. in order to form suitable agglomerates, higher density agglomerates may be readily produced by prolonged agitation or otherwise and I have found them to be highly satisfactory as desiccants. In Fig. 2, absorption characteristics of typical samples of calcium sulfate and of the product of my invention are illustrated. In this figure the curves for water sorption under dynamic test conditions are shown for 8 hour runs. These curves were obtained in the following manner; 60 grams of each of the dry desiccants were tested at 30° C. in the apparatus used by Le Lande, McCarter and Sanborn (Ind. Eng. Chem., 36, 99–109 (1944)) and at flow rates of 15 ft.$^3$/hr./lb. of desiccant. Increases in weights of the anhydrone tube show that the moisture content of the air leaving the desiccant at the end of each hour is .01–.1 milligram/litre and .04–.5 milligram/litre for the product of my invention and anhydrous calcium sulfate respectively.

The marked superiority of the product of my invention as a desiccant is plainly demonstrated by these curves, which correlate the percent water adsorbed vs. the time of exposure of the desiccant in an atmosphere of controlled relative humidity. These curves clearly indicate that the product of my invention would adsorb a greater portion of the total moisture present than will calcium sulfate in systems having relative humidity of 20 or 40%. This superiority, however, is not limited to any particular relative humidity conditions, but it is apparent irrespective of the condition imposed. Furthermore, at equilibrium conditions after a period of 36 hrs. of exposure, the product of my invention displays greater absorption efficiency than does calcium sulfate. In fact, at 40% R. H. (relative humidity) after an exposure of 36 hrs. calcium sulfate was found to retain 5.3% moisture, whereas the product of my invention had retained 10% moisture. Similarly, at 20% relative humidity calcium sulfate was found to retain 5% moisture and the product of my invention was found to have retained 7.7% moisture.

Figure 3:
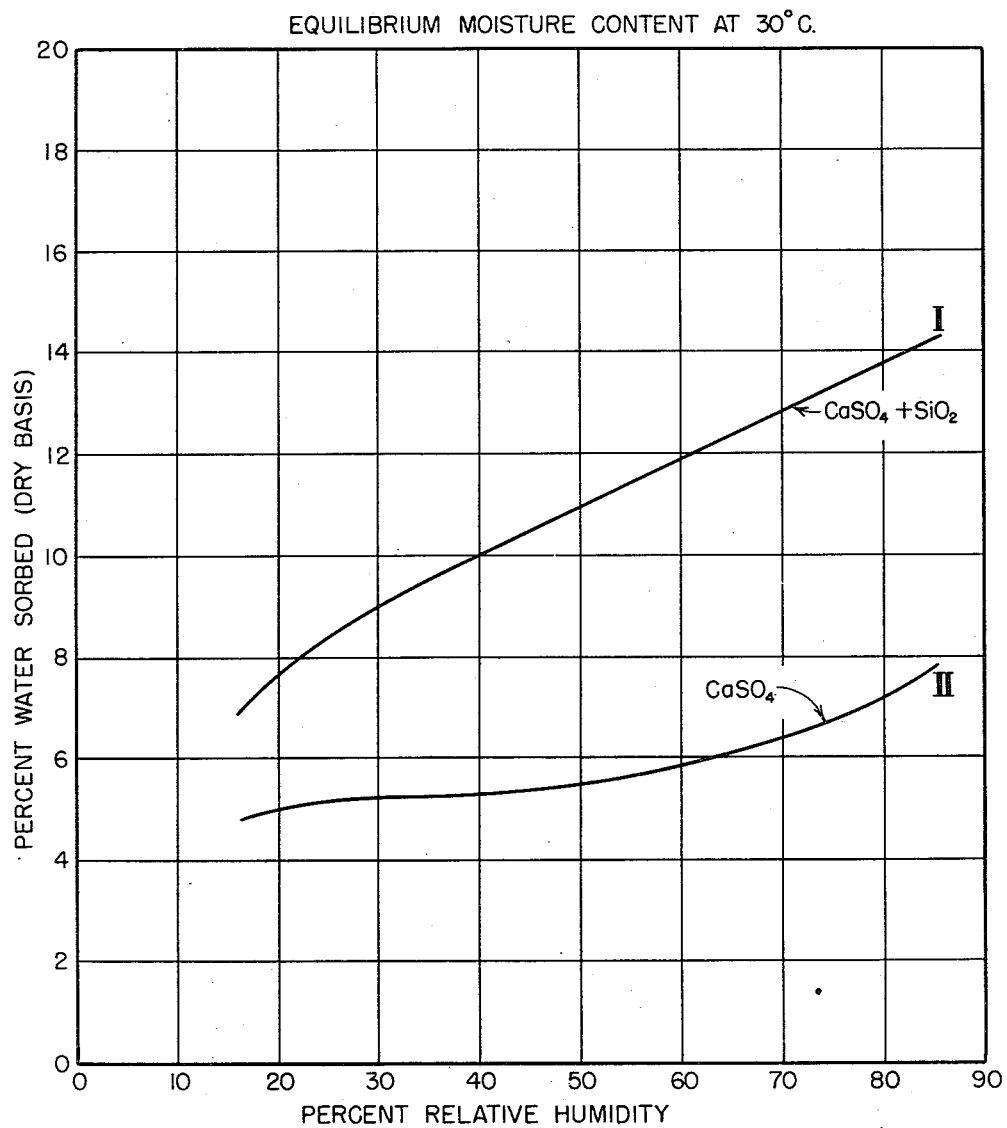
Figure 3 is a graph showing the equilibrium moisture characteristics of the product of my invention and calcium sulfate.

In Fig. 3 the equilibrium moisture content of the product of my invention and calcium sulfate at varying relative humidities is set forth. From this graph it will be apparent that the product of my invention is superior at all relative humidities.

The following examples are illustrative of the process of my invention and the product thereby resulting. Of course, it will be apparent that these results are not intended to limit the scope to the invention but that it includes all reasonable equivalents.

Example 1

One pound of wollastonite is mixed with 1.94 lbs. of water in the reactor 10 and agitated continuously. After proper mixing, 0.88 lb. of concentrated sulphuric acid (96.3% acid) is added to the mixture with stirring. A product weighing 3.36 lbs. and containing 49.7% moisture is obtained.

The material is washed to remove any unreacted acid and dried at 130–160° C. The product consisting of 1.69 lbs. of dry white powder is mixed with 50–60% of its weight of water and stirred till a densified and homogeneous mass is produced. The latter is set aside for a few minutes to harden and is then broken up to the desired size and dried. This product has a bulk density of about 18.9 lbs./cu. ft. and equilibrium moisture contents of 10.5% and 7.8% at relative humidities of 40% and 20% respectively.

Example 2

This is the same as Example 1 except that the dry white powder is mixed with 50–60% of its weight of water, the mixture is compressed under a pressure of about 4,000 lbs./sq. in. into small pills or large slugs which can be broken up to any desired size and dried. This product has a bulk density of about 37 lbs./cu. ft. and equilibrium moisture contents of 10.0% and 7.0% at relative humidities of 40% and 20% respectively.

*Example 3*

This is the same as Example 1 except that the dry white powder is agglomerated in a pelletizing apparatus of the type described in U. S. Letters Patent 2,102,654, to which 70–80% of its weight of water is slowly added during pelletization. The pellets obtained are then dried and sized. The bulk density of this product is about 28.8 lbs./cu. ft. Its equilibrium moisture contents at 40% and 20% relative humidities are 9.8% and 7.5% respectively.

*Example 4*

This is the same as Example 1 except that the product of the reaction between the wollastonite, water, and sulfuric acid is neither washed nor dried before further processing. Instead a mixture consisting of .40 lb. of a 41° Bé. sodium silicate solution and .20 lb. of water is stirred into the powder until a homogeneous mixture is obtained. The wet powder is now compressed under a pressure of about 4,000 lbs./sq. in. into small pills or large slugs which are broken up to the desired size and dried. This product has a bulk density of about 37.0 lbs./cu. ft., and equilibrium moisture contents of 8.9% and 6.0% at relative humidities of 40% and 20% respectively.

*Example 5*

This is the same as Example 1 except that the product of the reaction between the wollastonite, water, and sulfuric acid is agglomerated without washing or drying, in a pelletizing apparatus of the type described in U. S. Letters Patent 2,102,654 to which a mixture consisting of .40 lb. of 41° Bé. sodium silicate solution and .10 lb. of water is slowly added during pelletization. The pellets obtained are then dried and sized. The bulk density of this product is 34.9 lbs./cu. ft. and the equilibrium moisture contents at 40% and 20% relative humidities are 10.5% and 7.0% respectively.

*Example 6*

The calcium silicate-sulfuric acid reaction product is prepared in the same way as Example 1 except that 7.60 lbs. of water are used instead of 1.94 lbs., a 10% acid solution is thereby produced. The reaction product is thus in the form of a thick suspension which is washed and further processed as described in paragraph 2 of Example 1.

The final desiccant has a bulk density of about 19.0 lbs./cu. ft. and equilibrium moisture contents of 6.9% and 5.3% at relative humidities of 40% and 20% respectively.

*Example 7*

The calcium silicate-sulfuric acid reaction product is also prepared in the same way as Example 1 except that 1.24 lbs. of water are used, and the resulting solution has an acid concentration of 40%. The reaction product contains less moisture than that described in Example 1 but is washed and further processed in the manner described in paragraph 2 of Example 1.

The final product has a bulk density of about 19.0 lbs./cu. ft. and equilibrium moisture contents of 7.1% and 5.6% at relative humidities of 40% and 20% respectively.

*Example 8*

One pound of calcium silicate is mixed with two pounds of water, and .88 lb. of concentrated sulfuric acid (96.3% acid) is added to the mixture while the mixture is stirred. A product weighing 3.36 lbs. and containing 49.7% moisture is obtained. This product is washed and then extruded through a circular die to produce cylindrical rods. These rods are dried and a product having a bulk density of about 20 lbs./cu. ft. is produced. This product has an equilibrium moisture content of about 10.8% and 7.8% at relative humidities of 40% and 20% respectively.

Having thus disclosed my invention and described a preferred manner of putting it into practice, I claim as new and desire to secure by Letters Patent:

1. A process for producing a desiccant which comprises the steps of reacting calcium silicate with a solution of sulfuric acid having a concentration of between 10 and 35%, and in a molar amount of at least 95% of the molar amount of calcium silicate, and agglomerating the resulting product to form agglomerates by densifying to a bulk density of above about 19 lbs./cu. ft.

2. A process for producing a granular solid desiccant which comprises the steps of mixing calcium silicate with water, adding sulfuric acid to the mixture in an amount such that the water-acid solution has an acid concentration of between 10 and 35% and in a molar amount which is between 95 and 100% of the molar amount of calcium silicate, and densifying the resulting powdery precipitate to form agglomerates having a bulk density of above about 19 lbs./cu. ft.

3. The process of claim 2 in which the densification is accomplished by pelletizing the powdery precipitate with water.

4. The process of claim 2 in which the densification is accomplished by extruding the powdery reaction product.

5. The process of claim 2 in which the densification is accomplished by subjecting the powdery reaction product to a static pressure.

6. A process for producing a granular solid desiccant which comprises mixing calcium silicate with water, adding sulfuric acid to the mixture in amount such that the water acid solution has a calculated acid concentration of between 10 and 35% and in a molar amount which is at least 95% of the molar amount of calcium silicate, collecting the resulting precipitate, neutralizing the precipitate and densifying the resulting precipitate to form discrete agglomerate having a bulky density of about 19 lbs./cu. ft.

7. The process of claim 6 in which the neutralizing step is accomplished by washing the powdery precipitate until neutral.

8. The process of claim 6 in which the neutralizing step is accomplished by treating the powdery precipitate with a minor percentage of sodium silicate.

References Cited in the file of this patent

UNITED STATES PATENTS

| | | |
|---|---|---|
| 1,515,007 | Behrman | Nov. 11, 1924 |
| 1,571,054 | Hosenfeld | Jan. 26, 1926 |
| 1,715,439 | Van Nes | June 4, 1929 |
| 1,909,008 | Prange | May 16, 1933 |
| 2,402,370 | Chalmers | June 18, 1946 |
| 2,462,798 | Wilson | Feb. 22, 1949 |
| 2,625,516 | Metzger | Jan. 13, 1953 |

OTHER REFERENCES

Mellor: "Comprehensive Treatise on Inorganic and Theoretical Chemistry," vol. 6, page 987 (1925), Longmans, Green and Co., N. Y. C.